Oct. 2, 1934.   L. E. DURRIN   1,975,199
ATTACHMENT FOR SPLITTING KNIVES
Filed Aug. 18, 1931
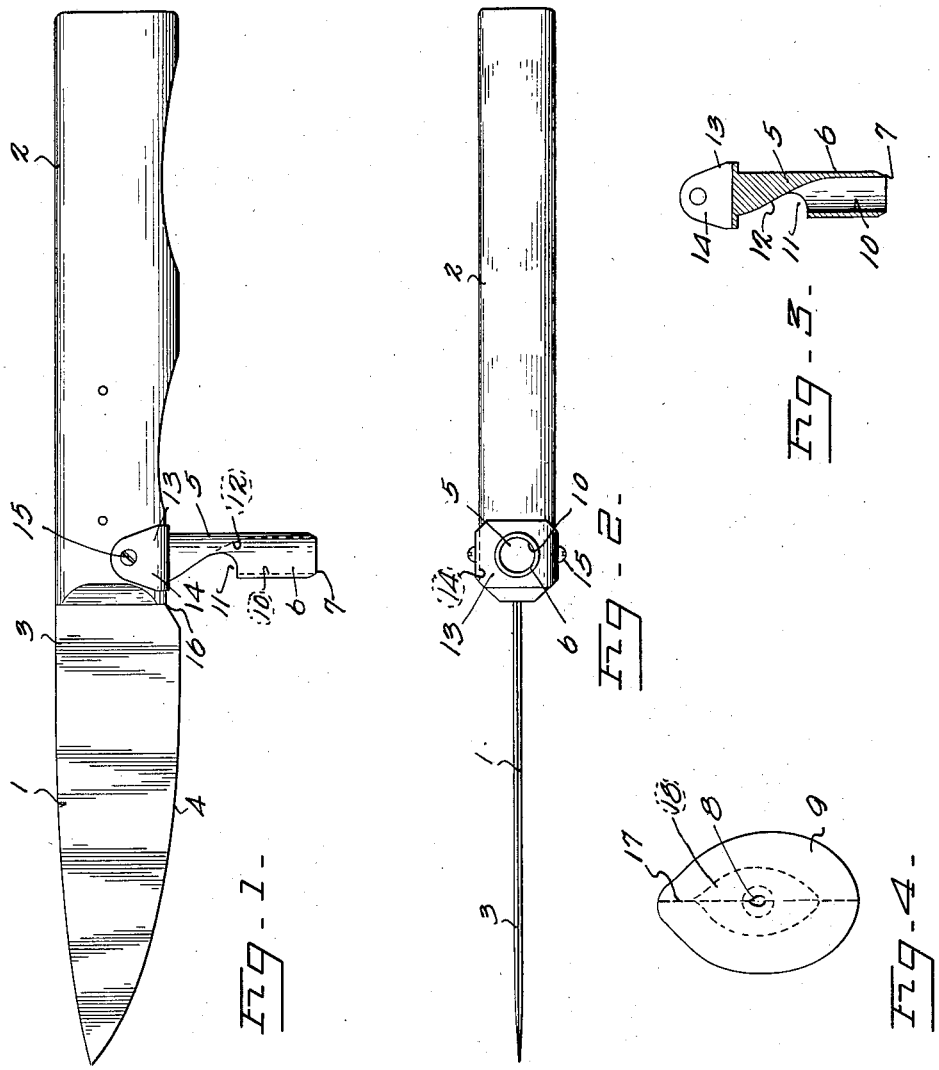
INVENTOR.
LEWIS E. DURRIN.
BY Munn & Co.
ATTORNEYS.

Patented Oct. 2, 1934

1,975,199

UNITED STATES PATENT OFFICE 1,975,199

ATTACHMENT FOR SPLITTING KNIVES

Lewis E. Durrin, San Jose, Calif.

Application August 18, 1931, Serial No. 557,876

1 Claim. (Cl. 146—204)

The present invention relates to attachments for splitting knives, and has particular reference to means for removing the stem end from apricots. The invention consists in the combinations, constructions and arrangements hereinafter described and claimed.

Heretofore in the preparation of apricots for canning, the fruit has first been halved by splitting it with a knife around the natural groove found in the fruit, after which each half is separately handled and the knife is used in removing the stem end. This takes considerable time, and more meat is usually cut away in removing the stem end than is absolutely necessary. A waste of meat therefore results. Also the cut fruit does not present a uniform appearance because the removal of the stem ends has resulted in irregular cuts being made in the fruit with the knife.

The principal object of the present invention is to provide an apricot splitting knife with a stem end removing attachment with which the operator can in one continuous operation first remove the stem end of the fruit and then halve the fruit along the natural surface groove in the fruit.

It is further proposed to provide a device of the character described that may be positioned on a splitting knife in such a manner as to allow an unobstructed use of the latter and which will position the knife so that after the fruit has had its stem end removed, the knife can be rocked so as to halve the fruit along the natural groove in the fruit.

Moreover, I propose to fashion the attachment in the form of a tubular member having self-cleaning means associated therewith this means ejecting the material away from the handle of the knife.

It is proposed to simplify the various structural features necessary for carrying out the above objects in such a manner that the attachment can be cheaply manufactured and attached to a standard apricot splitting knife, easily manipulated and efficient in operation.

Other objects will appear as the specification proceeds, and the novel features will be particularly pointed out in the appended claim.

For a better understanding of my invention reference should be had to the accompanying drawing, forming a part of this application, in which like numerals correspond to similar parts throughout the several views.

Figure 1 illustrates an apricot splitting knife with the attachment fastened thereto;

Figure 2 a bottom plan of the preceding view;

Figure 3 a vertical section through the attachment; and

Figure 4 a diagrammatic view showing the use of my device.

In carrying the invention into practice, I make use of a conventional apricot splitting knife 1 consisting of a handle portion 2 and a blade 3, the latter being fashioned with a cutting edge 4. The attachment 5 takes the form of a tubular member 6 presenting a cutting end 7 that is adapted for removing the stem end 8 from the apricot 9. A free discharge for the portion of the fruit entering the interior 10 of the tube is provided at 11, and an inclined surface or cam 12 is arranged as shown in Figure 3 so as to render the attachment self-cleaning by successive operations thereof. It will be noted that the material ejected from the surface 12 is forced toward the knife 3 and away from the handle 2 so as not to come into contact with the operator's hand.

Any suitable fastening means may be employed for securing the attachment to the knife, and in the present embodiment I have illustrated a substantially U-shaped portion 13 formed integral with the tubular member. The legs 14 are adapted for embracing the handle of the knife, and screws or the like 15 firmly anchor the attachment to the handle.

Although the attachment may be positioned at any desirable and convenient place on the knife, I prefer to mount the same adjacent to the junction 16 between the handle and the blade. I have found from practice that this construction lends itself to easy operation of the attachment, and the latter should be mounted in the plane of the blade in order to obtain the best results.

From the foregoing description of the various parts of the device, the operation thereof may be readily understood. The cutting end 7 of the attachment is applied to the apricot so as to encircle the stem end 8, and the latter is then removed by imparting a slight twisting movement to the attachment. This twisting motion is made in a direction to align the knife with the natural groove 17 in the surface of the fruit at the end of the stem removing step. The fruit is then halved along the groove 17 by rocking the knife on the attachment until the blade enters the fruit, whereupon the blade can be guided around the fruit for halving it. The stone or pit 18 may now be removed.

The combination tool which I have described is particularly well adapted for use in preparing apricots, peaches, tomatoes or the like for canning, and in fact it can be used in connection with any fruit or vegetable requiring eyes or the like to be removed prior to the canning operation. The device is designed primarily for apricots. The tubular member 6 will provide a uniform groove in the stem end of each half.

While I have shown only the preferred form of my invention, it should be understood that various changes or modifications may be made within the scope of the annexed claim without departing from the spirit and scope of the invention.

I claim:

The combination with an apricot halving knife having a handle and a blade extending in the same direction as the handle, of a tubular stem-removing member attached to the knife at the juncture between the handle and the blade and lying in the plane of the blade and extending at right angles to the axis of the handle, said tubular member having an opening in its wall that faces the knife blade and having an inclined surface extending from the top of the opening to the inner surface on the opposite side of the member.

LEWIS E. DURRIN.